Joel L. Bond.
Comb'd Single Gang & Subsoil Plow with
Grain & Corn Planter Attachment No. 113390. PATENTED APR 4 1871

Witnesses.
C. L. Evert
A. A. Yeatman

Inventor.
Joel L. Bond
per Alexander Mason
Atty

UNITED STATES PATENT OFFICE.

JOEL L. BOND, OF MARSHALLTOWN, IOWA.

IMPROVEMENT IN GANG AND SUBSOIL PLOWS.

Specification forming part of Letters Patent No. 113,390, dated April 4, 1871.

*To all whom it may concern:*

Be it known that I, J. L. BOND, of Marshalltown, in the county of Marshall, and in the State of Iowa, have invented certain new and useful Improvements in a Combined Single, Gang, and Subsoil Plow with Grain and Corn Planter Attachment; and I do hereby declare that the following is a full, clear, and exact description thereof, reference being had to the accompanying drawings, and to the letters of reference marked thereon, making a part of this specification.

The nature of my invention consists in the construction and arrangement of a combined single, gang, and subsoil plow with grain and corn planter attachment, which is intended as an improvement upon a similar machine for which I have already applied for Letters Patent.

In order to enable others skilled in the art to which my invention appertains to make and use the same, I will now proceed to describe its construction and operation, referring to the annexed drawings, in which—

Figure 1:
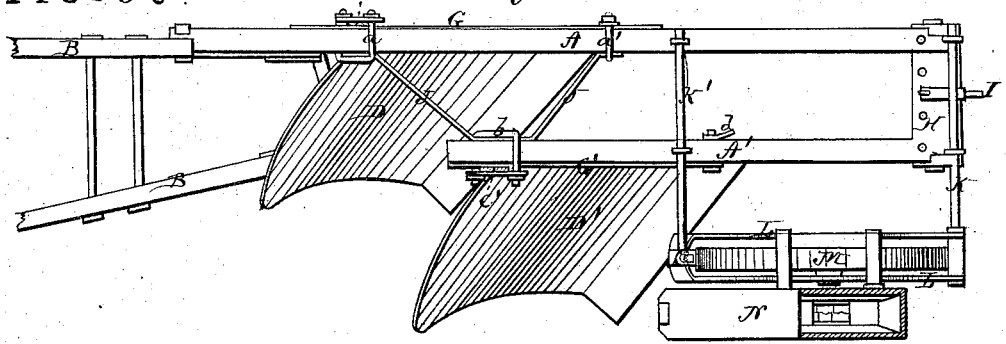
Figure 2:
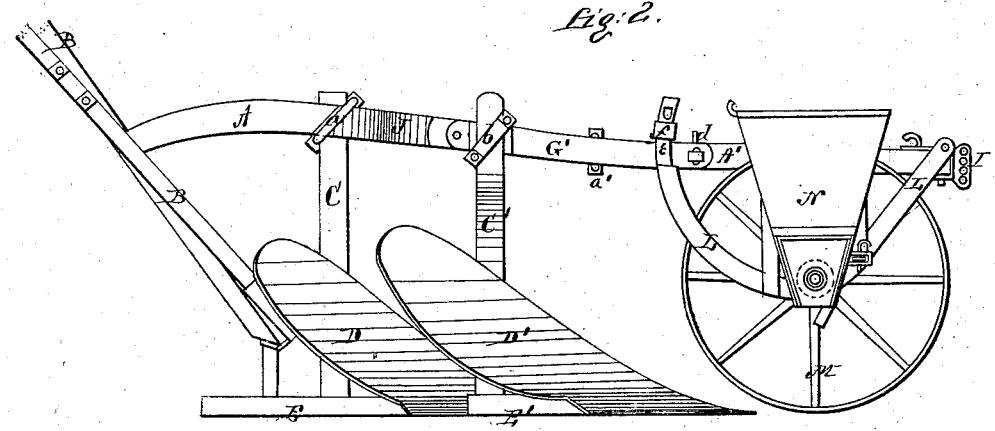

Figure 1 is a plan view, and Fig. 2 a side elevation, of my present machine.

A represents the plow-beam, and B B the handles, of any ordinary plow.

C represents an upright bar attached to the mold-board D and landside E, the handles B B being at their lower ends, by any suitable means, also connected with said mold-board and landside. The bar C passes between guides on metal plate G, which is fastened to the landside of the plow-beam in the following manner: The rear end of the plate G is pivoted to the plow-beam and secured by two clamps, a a', the clamp a passing in an oblique direction around the beam and the plate at the point where the bar C passes between the guides on the plate, so that this clamp, at the same time as it holds the plate G, also firmly secures the bar C at any desired height. The clamp a' passes around the beam and plate at the front end of the plate. The front end of the plate G is made narrower than this clamp, so that the plate can be raised or lowered at pleasure to regulate the depth at which the plow is to work.

On the mold-board side of the beam A, a suitable distance from and parallel with it, is another beam, A', the two beams being connected at their front ends by means of a cross-bar, H, to which the clevis I is fastened. The rear end of the beam A' is held securely by means of a bent metallic brace, J, the ends of which pass under or inside of the clamps a a', while the center bears against the inner side of the beam A' and is held by a clamp, b, all as shown in Fig. 1. To the beam A' is attached another plow, formed of the mold-board D', landside E', and upright bar C', thus forming, in the same manner as described in my former application, a gang-plow and a subsoil-plow. The upright bar C' passes between guides on a plate, G', the rear end of which is pivoted to the beam A' and held by the clamp b in the same manner as the clamp a holds the plate G to the beam A, as above mentioned. The front end of the plate G' is slotted, as shown in Fig. 2, and a screw-bolt with thumb-nut d fastens it to the beam A'. By this means this plate may also be raised and lowered at will to regulate the depth at which its plow is to work.

On top and across the beams A A', in suitable staples or boxes, are placed two rods, K K', which are adjustable in so far that they may be drawn out or pushed in at will to regulate the distance at which the gage-wheel M is to work from the beam A'. To the front one, K, of these rods is hinged or pivoted the front end of the gage-wheel frame L. The rear end of this frame terminates in a bar, e, which passes through a loop, f, formed on the end of the rear rod, K', so that the said frame may be raised or lowered at will to regulate the depth at which the gage-wheel M is to operate. Within the frame L the said wheel M is placed, and to the outer side of the frame is attached the corn and seed drill attachment N, said attachment being constructed and fastened in substantially the same manner as described in my former application above referred to. The operation of this machine is also the same as in my former case.

Having thus fully described my invention, what I claim as new, and desire to secure by Letters Patent, is—

1. The arrangement of the beams A A', cross-bar H, bent brace J, plates G G', clamps a a' and b, bolt and nut d, and the plow-bars C C', all substantially as shown and described, and for the purposes herein set forth.

2. The arrangement, with the frame-beams A A', of the adjustable rods K K, frame L, bar e, loop f, seed-drill box N, and gage-wheel M, all constructed and operating substantially as set forth.

In testimony that I claim the foregoing I have hereunto set my hand this 14th day of November, 1870.

JOEL L. BOND.

Witnesses:
 JAMES LANG,
 A. P. LOWERY.